H. A. HAAS.
KITCHEN UTENSIL.
APPLICATION FILED OCT. 6, 1913.

1,100,298.

Patented June 16, 1914.

WITNESSES:

INVENTOR
Harriet A. Haas
BY
ATTORNEY

UNITED STATES PATENT OFFICE.

HARRIET A. HAAS, OF OAKLAND, CALIFORNIA.

KITCHEN UTENSIL.

1,100,298. Specification of Letters Patent. Patented June 16, 1914.

Application filed October 6, 1913. Serial No. 793,549.

*To all whom it may concern:*

Be it known that I, HARRIET A. HAAS, a citizen of the United States, residing at Oakland, in the county of Alameda and State of California, have invented certain new and useful Improvements in Kitchen Utensils, of which the following is a specification.

This invention relates to improvements in kitchen articles and more particularly to a dish for mixing mayonnaise dressing.

The principal object of my invention is the construction of a dish having separate compartments and means by which the contents may be slowly transferred from one to the other. Thus when making mayonnaise the mixing is done in the larger compartment, the oil placed in the smaller and gradually transferred to the mixing compartment insuring the complete incorporation of the oil and egg.

With this object in view my invention consists in the novel construction and arrangement of the mixing bowl as herein described and illustrated in the attached drawing, and as more specifically pointed out in the appended claims.

Figure 1:
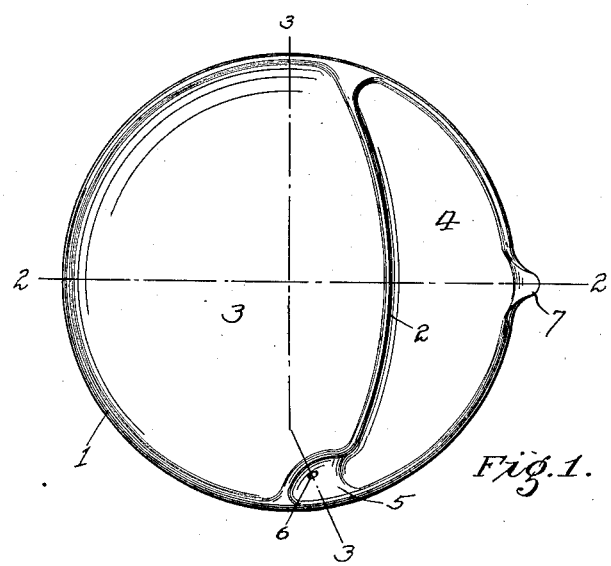
Figure 2:
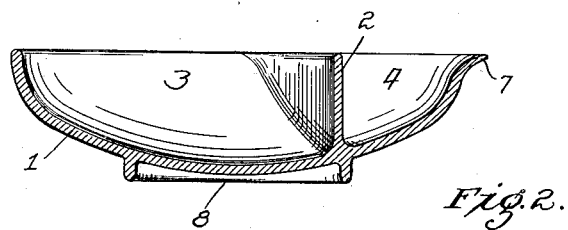
Figure 3:
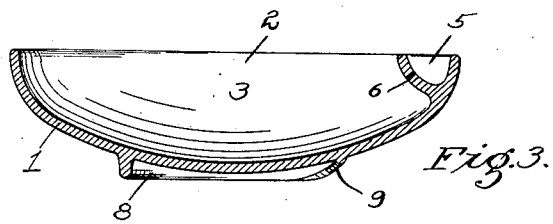

In the drawing:—Figure 1 is a view in plan of my improved bowl showing the compartments and communication therebetween. Fig. 2 is a view in section on the line 2—2 Fig. 1. Fig. 3 is a view in section on the line 3—3 Fig. 1.

Denoting corresponding parts by the same numerals of reference 1 is a bowl of any shape preferably shallow and well rounded so that a beating tool may be used therein. Extending across the interior is a division wall 2 forming two compartments 3 and 4, the former being larger than the latter being used for mixing while the latter is used for oil storage. At one end of compartment 4 is formed a small cavity 5, which is well above the bottom of compartment 4, and a hole 6 is provided from this cavity to the large compartment 3. A lip 7 is provided that the surplus oil may be easily returned to the bottle while on the underside is a rim 8 to insure stability when placed on a flat surface. This rim is inclined upwardly at a point 9 directly under the cavity 5 so that it is easy to tilt the bowl in that direction.

In use the egg yolk is placed in compartment 3 and the oil in compartment 4. When it is desired to add oil to the egg the bowl is tilted toward the cavity 5 causing the oil to flow therein and through the hole 6 when the bowl is again placed flat the oil will cease to flow and be evident that the amount allowed to enter compartment 3 may in this manner be easily controlled.

While I have described the preferred embodiment of my invention it will of course be understood that minor changes may be made in detail and design without departing from the spirit thereof.

What I claim as new and wish to cover by Letters Patent is:—

1. A utensil of the character described comprising, a bowl, a division wall therein forming two compartments, a cavity at the end of one compartment above the general level thereof and a hole between said cavity and the opposite compartment.

2. A mixing dish comprising a bowl, a division wall therein forming two compartments, an opening between said compartments to allow the contents to flow from one to the other, a rim on the bottom of said bowl, and an inclined portion to said rim below the said opening allowing the bowl to be easily tilted in that direction.

In testimony whereof I affix my signature in presence of two witnesses.

HARRIET A. HAAS.

Witnesses:
 F. P. SCHROEDER,
 R. M. OYARZO.

Copies of this patent may be obtained for five cents each, by addressing the " Commissioner of Patents, Washington, D. C."